(12) United States Patent
Dalton et al.

(10) Patent No.: US 7,286,798 B1
(45) Date of Patent: Oct. 23, 2007

(54) ELECTRONIC SHELF LABEL

(75) Inventors: Gary C. Dalton, Snellville, GA (US);
Albertus M. G. Claessen, Oakwood, GA (US); Jeffrey E. Scheb, Roswell, GA (US); Sik Piu Kwan, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 304 days.

(21) Appl. No.: 10/270,936

(22) Filed: Oct. 15, 2002

(51) Int. Cl.
*H04B 5/00* (2006.01)

(52) U.S. Cl. .................... 455/41.2; 455/572; 340/5.91; 340/693.3

(58) Field of Classification Search ............ 340/539.3, 340/693.3, 10.34, 5.91, 572.1, 572.2, 10.4; 455/41.2, 78
See application file for complete search history.

(56) References Cited

U.S. PATENT DOCUMENTS

| | | | |
|---|---|---|---|
| 4,550,444 A * | 10/1985 | Uebel .................. 340/10.34 |
| 5,510,602 A | 4/1996 | Evans et al. |
| 5,640,683 A | 6/1997 | Evans et al. |
| 5,850,181 A * | 12/1998 | Heinrich et al. ......... 340/572.1 |
| 5,940,006 A * | 8/1999 | MacLellan et al. ........ 340/10.1 |
| 6,011,958 A * | 1/2000 | Yokota et al. ................ 455/73 |
| 6,282,407 B1 * | 8/2001 | Vega et al. ................ 455/41.1 |
| 6,356,230 B1 * | 3/2002 | Greef et al. ................ 342/127 |
| 6,456,668 B1 * | 9/2002 | MacLellan et al. ......... 375/283 |
| 6,745,008 B1 * | 6/2004 | Carrender et al. ......... 455/41.1 |
| 6,775,323 B1 * | 8/2004 | Vasudevan Pillai et al. 375/238 |
| 6,837,427 B2 * | 1/2005 | Overhultz et al. .......... 235/382 |
| 6,944,424 B2 * | 9/2005 | Heinrich et al. ........... 455/41.1 |
| 2004/0005863 A1 * | 1/2004 | Carrender .................. 455/41.1 |

* cited by examiner

*Primary Examiner*—Edward F. Urban
*Assistant Examiner*—Adeel Haroon
(74) *Attorney, Agent, or Firm*—Paul W. Martin

(57) ABSTRACT

An electronic shelf label with a modulated backscatter communication system which can actively transmit signals. The electronic shelf label includes a modulated backscatter receiver for receiving a first modulated radio frequency (RF) carrier signal, and a transmitter powered by the first modulated RF carrier signal for transmitting a second modulated RF carrier signal.

16 Claims, 2 Drawing Sheets

ELECTRONIC SHELF LABEL

BACKGROUND OF THE INVENTION

The present invention relates to electronic shelf label (ESL) systems or electronic signage, and more specifically to an electronic shelf label.

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items.

One type of ESL is disclosed in commonly assigned to U.S. Pat. No. 5,510,602. This type of ESL takes advantage of modulated backscatter communication techniques disclosed in commonly assigned U.S. Pat. No. 5,640,683. These patents are hereby incorporated by reference.

ESLs may be required to display information in many retail environments, including coolers and freezers where specially coated glass doors can reduce signal strength from wireless ESLs. Communication difficulties often require additional RF communication equipment to be installed to compensate for the loss. For example, in the system disclosed in the referenced U.S. Patent, a communication base station (CBS) must be dedicated and in close proximity to a cooler or freezer in order to communicate with ESLs in that cooler or freezer. In addition, noise generated by devices or reflected from devices can severely impact the ability of a CBS to receive a response (acknowledgement) from the ESL following successful execution of a command by the ESL.

Therefore, it would be desirable to provide an ESL with enhanced communication capability to avoid installation of the additional RF communication equipment, such as CBSs and antennae.

SUMMARY OF THE INVENTION

In accordance with the teachings of the present invention, an electronic shelf label is provided.

The electronic shelf label includes a modulated backscatter receiver for receiving a first modulated radio frequency (RF) carrier signal, and a transmitter powered by the first modulated RF carrier signal for transmitting a second modulated RF carrier signal.

It is accordingly an object of the present invention to provide an electronic shelf label.

It is another object of the present invention to provide an electronic shelf label which receives signals using protocols designed for modulated backscatter techniques and which sends responses using a semi-active transmitter powered by a received carrier signal, It is another object of the present invention to provide an electronic shelf label which provides a passive uplink response by using energy in a received signal.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
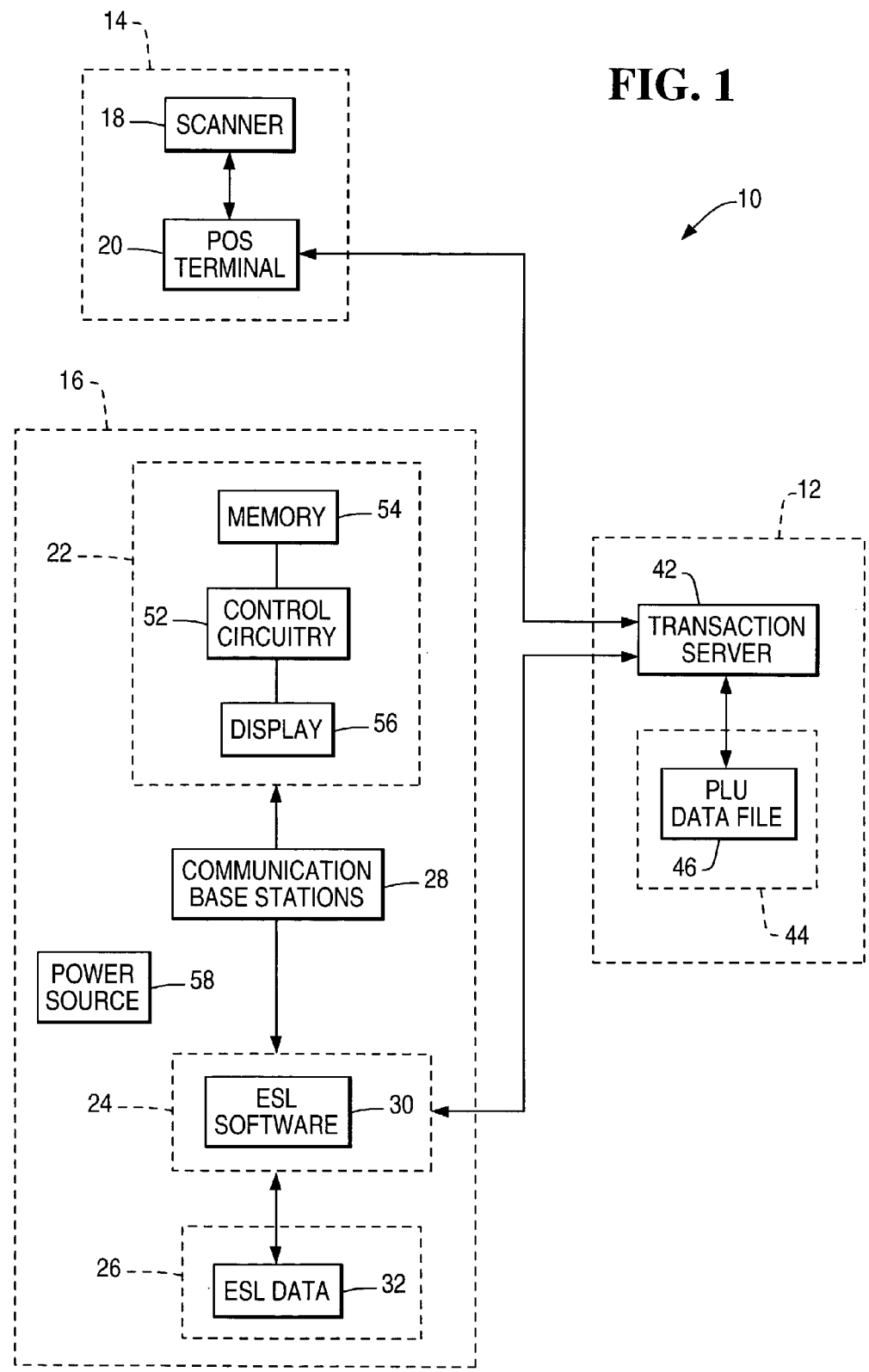
FIG. 1 is a block diagram of a transaction management system.

Referring now to FIG. 1, store system 10 primarily includes host computer system 12, point-of-sale (POS) system 14, and electronic shelf label (ESL) system 16.

POS system 14 includes bar code scanner 18 and terminal 20.

ESL system 16 primarily includes ESLs 22, host ESL terminal 24, ESL storage medium 26, and communication base stations (CBSs) 28.

ESLs 22 are typically attached to shelf units within a store. Each ESL 22 includes control circuitry 52, a number of data registers 54, a display 56, and power source 58.

Control circuitry 52 preferably includes all circuitry necessary for wireless communication with host ESL terminal 24. Control circuitry 52 may include an application specific integrated circuit (ASIC) and an antenna. Communication between control circuitry 52 and host ESL terminal 24 may include modulated backscatter radio frequency (RF) communication and active communication for both downlink and uplink transmissions.

Data registers 54 contain data, usually the prices of items on the shelf. The data may also include symbols and phrases, such as promotional information associated with the items.

Display 56 may include a liquid crystal display (LCD) or electronic paper type display.

Power source 58 is preferably one or more batteries.

Host ESL terminal 24 executes ESL software 30, which controls storage and display of ESL data 32. ESL software 30 sends data from ESL data 32 to ESLs 22 and determines whether correct information is being displayed by ESLs 22 when an acknowledgement is received from ESLs 22. Additionally, ESL software 30 may improve statistical accuracy by checking the displayed information against a checksum calculated from information in PLU data file 44.

ESL storage medium 26 stores ESL data 32 and is preferably a fixed disk drive.

CBSs 28 send messages from host ESL terminal 24 to ESLs 22 and receive messages to host ESL terminal 24 from ESLs 22. CBSs 28 are typically mounted to ceilings. The number and locations of CBSs 28 are determined by reception quality readings throughout a store. CBSs 28 are typically connected to host ESL terminal 24 through wire cables.

Host computer system 12 includes transaction server 42 and storage medium 44.

Transaction server 42 distributes price and other information to POS terminals 20 and host ESL terminal 24.

Storage medium 44 stores PLU data file 44. PLU file 44 is preferably a primary location for storing item prices and other information.

Here, terminals 20, 24, and 42 are shown as separate components that are networked together, but they may also be combined in different ways. For example, ESL terminal 24 and transaction server 42 may be combined to form a single host computer. POS terminal 20 and transaction server 42 may be combined to form a POS terminal which doubles as a host computer for a network of other POS terminals.

Figure 2:
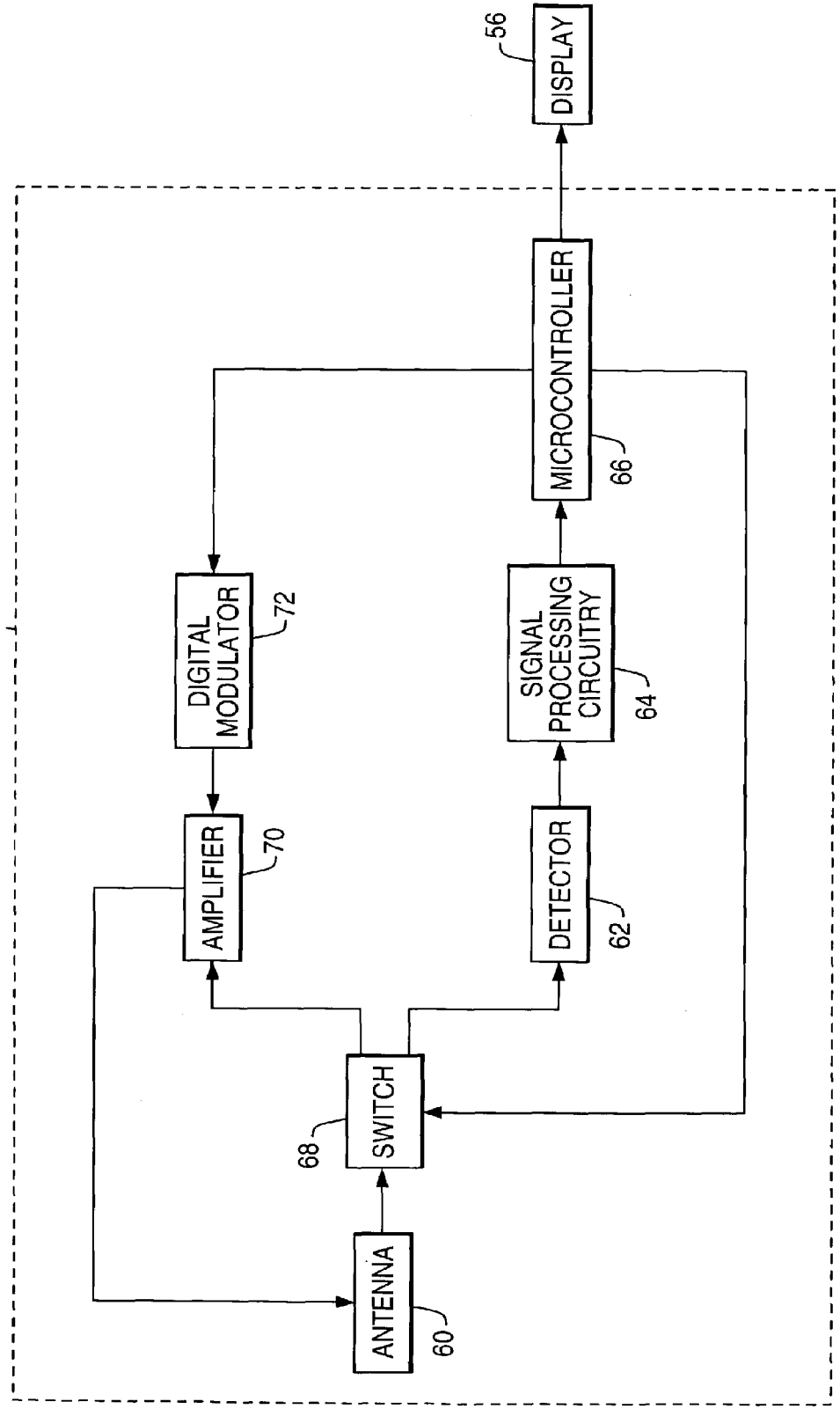
FIG. 2 is a circuit diagram of control circuitry within the electronic shelf label.

Turning now to FIG. 2, control circuitry 52 is shown in more detail.

Control circuitry 52 includes antenna 60, detector 62, signal processing circuitry 64, and microcontroller 66.

Antenna 60 receives and transmits modulated RF signals. Antenna 60 is preferably a quarter-wave folded planar conductor which operates around a carrier frequency of 2.45 GHz.

Reception of downlink signals is similar to the method disclosed in the previously incorporated U.S. Pat. No. 5,668,560. A downlink signal includes a modulated 2.45 carrier signal.

Detector 62 extracts an information signal from the downlink signal. Detector 62 is preferably a Schottky barrier-type silicon diode.

Signal processing circuitry 64 amplifies and demodulates the detected downlink signal to produce a downlink information signal.

Microcontroller 66 identifies on/off keyed data bits in the downlink information signal to generate data for display by display 14. Microcontroller 66 also provides an uplink information signal.

Under the present invention, control circuitry 62 additionally includes switch 68, amplifier 70, and digital modulator 72.

Switch 68 routes the downlink signal to amplifier 70. Switch 68 is controlled by microcontroller 66.

Amplifier 70 amplifies an uplink signal from digital modulator 72. Amplifier 70 is powered by energy in the 2.45 carrier signal of the downlink signal.

Digital modulator 72 produces the uplink signal from an uplink information signal provided by microcontroller 66. Microcontroller 66 activates switch 68 to cause amplification and transmission of the uplink signal from digital modulator 72. Microcontroller 66 may be programmed to activate switch 68 if ESL 22 is placed in a location where unamplified passive communication is difficult.

For example, ESL 22 may be located in a freezer. Instead of attempting to return an acknowledgment using passive modulated backscatter techniques, microcontroller 66 is programmed to activate switch 68 to amplify the uplink signal before transmitting it. If microcontroller 66 does not cause switch 68 to route the incoming downlink signal to amplifier 70, the uplink signal goes to antenna 60 unamplified.

Advantageously, transmission of amplified uplink signals uses energy in the downlink carrier signal, with little or no power from power source 58.

Although the present invention has been described with particular reference to certain preferred embodiments thereof, variations and modifications of the present invention can be effected within the spirit and scope of the following claims.

What is claimed is:

1. A communication device comprising:
    a modulated backscatter receiver for receiving a first modulated radio frequency (RF) carrier signal from a host system;
    a transmitter for transmitting a second modulated RF carrier signal to the host system;
    a microcontroller coupled to the receiver and the transmitter; and
    a battery from providing a primary first power sufficient to power the receiver, the transmitter, and the microcontroller in a first environment;
    wherein the microcontroller selectively couples the first modulated RF carrier signal to the transmitter for providing an optional second power additive to the first power for amplifying the second modulated RF carrier signal when the communication device is located in a second environment in which the second modulated RF carrier signal is degraded and is too weak to be received by the host system when the transmitter is powered only by the battery.

2. The communication device of claim 1, wherein the modulated backscatter receiver comprises:
    a detector for extracting an information signal from the first modulated RF carrier signal to produce a detected downlink signal; and
    signal processing circuitry for amplifying and demodulating the detected downlink signal to produce a downlink information signal.

3. The communication device of claim 2, further comprising:
    a display powered by the first power;
    wherein the microcontroller identifies data bits in the downlink information signal to generate display data for display by the display.

4. The communication device of claim 3, wherein the display data includes price data associated with an adjacent item.

5. The communication device of claim 1, wherein the microcontroller produces an uplink information signal, and wherein the transmitter comprises:
    a digital modulator for modulating a carrier signal with the uplink information signal to produce the second modulated RF carrier signal.

6. The transmitter of claim 5, further comprising:
    an amplifier coupled to the digital modulator;
    wherein the microcontroller selectively couples the first modulated RF carrier signal to the amplifier for amplifying the second modulated RF carrier signal.

7. The communication device of claim 6, further comprising:
    a switch controlled by the microcontroller for routing the first modulated RF carrier signal to the amplifier.

8. The communication device of claim 1, wherein the microcontroller couples the first modulated RF carrier signal to the transmitter if the second modulated RF carrier signal is being attenuated.

9. The communication device of claim 1, wherein the microcontroller couples the first modulated RF carrier signal to the transmitter if the second modulated RF carrier signal is being affected by noise.

10. A communication device comprising:
    an antenna;
    a modulated backscatter receiver coupled to the antenna for receiving a first modulated radio frequency (RF) carrier signal from a communicating system including a detector for extracting an information signal from the first modulated RF carrier signal to produce a detected downlink signal and signal processing circuitry for amplifying and demodulating the detected downlink signal to produce a downlink information signal;
    a transmitter coupled to the antenna for transmitting a second modulated RF carrier signal to the communicating system including a digital modulator for modulating a carrier signal with an uplink information signal to produce the second modulated RF carrier signal and an amplifier coupled to the digital modulator;
    a switch coupled between the antenna and the amplifier;
    a microcontroller for identifying data bits in the downlink information signal and for producing the uplink information signal; and
    a battery for providing a primary first power sufficient to power the receiver, the transmitter, and the microcontroller in a first environment;

wherein the microcontroller further operates the switch to selectively couple the antenna to the amplifier during reception of the first modulated RF carrier signal for optionally providing a second power additive to the first power for amplifying the second modulated RF carrier signal when the communication device is located in a second environment in which the second modulated RF carrier signal is degraded and is too weak to be received by the communicating system when the transmitter is powered only by the battery.

11. The communication device of claim 10, further comprising:
a display powered by the first power;
wherein the microcontroller further generates price data for display associated with an adjacent item from the data bits in the downlink information signal.

12. A communication method comprising:
(a) receiving a first modulated radio frequency (RF) carrier signal from a host system by a modulated backscatter receiver powered by a primary first power source including a battery;
(b) transmitting a second modulated RF carrier signal to the host system by a transmitter powered by the first power source, wherein the first power source is sufficient to power the receiver and the transmitter in a first environment;
(c) selectively coupling the first modulated RF carrier signal to the transmitter for providing an optional second power source additive to the first power source for amplifying the second modulated RF carrier signal by a microcontroller, coupled to the receiver and the transmitter and powered by the first power source, when the transmitter is operating in a second environment in which the second modulated RF carrier signal is degraded and is too weak to be received by the host system when the transmitter is powered only by the first power source.

13. The communication method of claim 12, further comprising:
(d) determining price data associated with an adjacent item in the first modulated RF carrier signal by the microcontroller; and
(e) displaying the price data by a display powered by the first power source.

14. The communication method of claim 12, wherein step (c) comprises:
(c-1) selectively coupling the first modulated RF carrier signal to an amplifier of the transmitter by the microcontroller.

15. The communication method of claim 12, wherein step (c) comprises:
(c-1) operating a switch to couple the first modulated RF carrier signal to the transmitter by the microcontroller.

16. A communication device comprising:
an electronic shelf label including
a display for displaying price information;
a modulated backscatter receiver for receiving a first modulated radio frequency (RF) carrier signal from a host system;
a transmitter for transmitting a second modulated RF carrier signal to the host system;
a microcontroller coupled to the display, the receiver and the transmitter; and
a battery for providing a primary first power to the display, the receiver, the transmitter, and the microcontroller;
wherein the microcontroller couples the first modulated RF carrier signal to the transmitter for providing an optional second power additive to the first power for amplifying the second modulated RF carrier signal;
wherein the electronic shelf label is located in an environment in which the second modulated RF carrier signal is degraded and unreceivable by the host system when the transmitter is powered only by the battery.

* * * * *